(12) United States Patent
German et al.

(10) Patent No.: US 8,831,504 B2
(45) Date of Patent: Sep. 9, 2014

(54) SYSTEM AND METHOD FOR GENERATING INDIVIDUALIZED EDUCATIONAL PRACTICE WORKSHEETS

(75) Inventors: Kristine A. German, Webster, NY (US); Robert M. Lofthus, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 320 days.

(21) Appl. No.: 12/958,768

(22) Filed: Dec. 2, 2010

(65) Prior Publication Data

US 2012/0141967 A1 Jun. 7, 2012

(51) Int. Cl.
G09B 7/00 (2006.01)
(52) U.S. Cl.
CPC .......................................... *G09B 7/00* (2013.01)
USPC ............................ 434/350; 434/322; 434/323
(58) Field of Classification Search
CPC ........................................................... G09B 7/00
USPC ........................... 434/322, 323, 336, 350, 353
See application file for complete search history.

(56) References Cited

U.S. PATENT DOCUMENTS

| | | | |
|---|---|---|---|
| 4,464,118 A | 8/1984 | Scott et al. | |
| 4,793,810 A | 12/1988 | Beasley, Jr. | |
| 5,387,107 A | 2/1995 | Gunter | |
| 5,730,602 A | 3/1998 | Gierhart et al. | |
| RE36,028 E | 1/1999 | Deesen et al. | |
| 6,118,973 A * | 9/2000 | Ho et al. | 434/362 |
| 6,154,757 A | 11/2000 | Krause | |
| 6,208,771 B1 | 3/2001 | Jared et al. | |
| 6,215,901 B1 | 4/2001 | Schwartz | |
| 6,515,690 B1 | 2/2003 | Back | |
| 6,606,479 B2 | 8/2003 | Cook et al. | |
| 6,673,611 B2 | 1/2004 | Thompson et al. | |
| 6,759,206 B1 | 7/2004 | Rubin et al. | |
| 6,953,343 B2 | 10/2005 | Townshend | |
| 7,036,075 B2 | 4/2006 | Walker | |
| 7,147,473 B2 | 12/2006 | Harpaz | |

(Continued)

FOREIGN PATENT DOCUMENTS

| | | |
|---|---|---|
| EP | 0556530 | 8/1993 |
| JP | 2000123115 | 4/2000 |

(Continued)

OTHER PUBLICATIONS

U.S. Appl. No. 12/840,584, filed Jul. 21, 2010, Venable.

(Continued)

*Primary Examiner* — Bruk Gebremichael
(74) *Attorney, Agent, or Firm* — Fox Rothschild LLP

(57) ABSTRACT

A system and a method for generating individualized academic worksheets are provided. The method includes accessing a database of problems and student data relating to at least one student, including evaluation data associated with practice worksheets that were previously administered to the students. The method further includes selecting problems from the database using the evaluation data for each student and generating an individualized practice worksheet file including the selected problems. Each practice worksheet file includes instructions for printing a presentation of each problem and at least one evaluation area. The method further includes updating the evaluation data, wherein after a printed copy of a practice worksheet file is administered to the student, the evaluation areas of the printed copy are marked with evaluation marks by a human evaluator in accordance with the human evaluator's evaluation, and the updated evaluation data is based on the evaluation marks.

18 Claims, 5 Drawing Sheets

(56) References Cited

U.S. PATENT DOCUMENTS

| | | |
|---|---|---|
| 7,734,652 B2 | 6/2010 | Tamayo |
| 8,254,605 B2 | 8/2012 | Van Schaack et al. |
| 2002/0087560 A1* | 7/2002 | Bardwell ................. 707/100 |
| 2003/0180703 A1 | 9/2003 | Yates et al. |
| 2004/0091847 A1* | 5/2004 | Creamer ................. 434/353 |
| 2005/0114160 A1 | 5/2005 | Boehme et al. |
| 2006/0121432 A1* | 6/2006 | Sun ......................... 434/322 |
| 2006/0216683 A1* | 9/2006 | Goradia ................... 434/322 |
| 2007/0031801 A1* | 2/2007 | Tidwell-Scheuring et al. ......................... 434/322 |
| 2008/0108035 A1* | 5/2008 | Warda ..................... 434/335 |
| 2008/0286732 A1 | 11/2008 | German |
| 2009/0246744 A1 | 10/2009 | Lofthus |
| 2009/0271433 A1 | 10/2009 | Perronnin et al. |
| 2010/0047758 A1* | 2/2010 | McCurry et al. ......... 434/353 |
| 2010/0075290 A1 | 3/2010 | DeYoung et al. |
| 2010/0075291 A1 | 3/2010 | DeYoung et al. |
| 2010/0075292 A1 | 3/2010 | DeYoung et al. |
| 2010/0157345 A1 | 6/2010 | Lofthus |
| 2010/0159432 A1 | 6/2010 | German |
| 2010/0159437 A1 | 6/2010 | German |
| 2010/0159438 A1 | 6/2010 | German |
| 2010/0227306 A1 | 9/2010 | Lofthus |
| 2011/0159470 A1* | 6/2011 | Hradek et al. ............. 434/262 |

FOREIGN PATENT DOCUMENTS

| | | |
|---|---|---|
| WO | WO 98/32107 | 7/1998 |
| WO | WO 02/21259 | 3/2002 |
| WO | WO 2004/090834 | 10/2004 |

OTHER PUBLICATIONS

The Abecedarian Reading Assessment, Sebastian Wren, Ph.D and Jennifer Watts, Ph.D., Copyright, 2002.

Chuat, "CategoriX & ClusteriX", Xerox Research Centre Europe, licensing@xrce.xerox.com (May 2005).

Dymetman et al., "Intelligent Paper", Xerox Research Centre Europe, Meylan, France, Electronic Publishing, Artistic Imaging, and Digital Typography, Lecture Notes in Computer Science, vol. 1375, 1998, pp. 392-406.

"Introduction to the Livescribe Platform", Livescribe SDKs, copyright 2007-2010 Livescribe Inc., Dec. 20, 2010, 11:58 a.m.

* cited by examiner

SYSTEM AND METHOD FOR GENERATING INDIVIDUALIZED EDUCATIONAL PRACTICE WORKSHEETS

CROSS-REFERENCE TO RELATED APPLICATIONS

The present application is related to U.S. application Ser. Nos. 12/339,979, 12/340,054, 12/340,116, all filed on Dec. 19, 2008, U.S. application Ser. No. 12/054,824, filed Mar. 25, 2008, U.S. application Ser. No. 11/749,192, filed May 16, 2007, U.S. application Ser. No. 12/771,534, filed Apr. 30, 2010, and U.S. application Ser. No. 12/840,584, filed Jul. 21, 2010.

TECHNICAL FIELD

The present disclosure relates generally to a system and method for generating individualized educational practice worksheet. In particular, the present disclosure relates to obtaining evaluation results of a student's performance on paper-based practice worksheets that are used in conjunction with teaching an academic topic or skill, and using the obtained results for generating additional educational practice worksheets that are individualized in accordance with the student's mastery and readiness to progress.

BACKGROUND

When an academic topic or skill is taught to a student, the teacher instructs the students in the class and provides the students with practice worksheets to practice and reinforce the material. Typically, a single paper-based worksheet is duplicated for the entire class to use, even though the students may be progressing at different speeds. The advantages of the paper-based worksheet include that it can be quickly corrected and annotated by the teacher. Both the student and the teacher get immediate feedback and the student/teacher relationship is reinforced. For many academic areas, manually writing the answer on a paper worksheet is the best way to acquire knowledge and skill. Additionally, the paper worksheet is portable and durable. It can be brought home the same day for parents to view, and then saved, if desired.

While individualized instruction and practice may be available via a computer, advantages of the paper-based, corrected, and annotated worksheets are lost.

SUMMARY

The present disclosure is directed to an educational practice worksheet generator system for generating individualized educational practice worksheets to be administered to at least one student. The system includes a tangible processor and a memory with instructions to be executed by the tangible processor for accessing a database of problems and student data relating to the students, including evaluation data associated with at least one practice worksheet that was previously administered to the students. The memory further includes instructions for execution by the processor for selecting for each student problems from the database using the evaluation data and generating an individualized practice worksheet file for each student that includes the selected problems. Each practice worksheet file includes instructions for printing a presentation of each selected problem and at least one evaluation area. After a printed copy of a practice worksheet file generated for a student is administered to the student, evaluation areas of the printed copy are marked with evaluation marks by a human evaluator in accordance with the human evaluator's evaluation. The memory further includes instructions to be executed by the tangible processor for updating the evaluation data with data that corresponds to the evaluation marks.

The present disclosure is also directed to a method for generating individualized academic worksheets. The method includes accessing a database of problems and student data relating to at least one student, including evaluation data associated with practice worksheets that were previously administered to the students. The method further includes selecting problems from the database using the evaluation data for each student and generating an individualized practice worksheet file including the selected problems. Each practice worksheet file includes instructions for printing a presentation of each problem and at least one evaluation area. The method further includes updating the evaluation data, wherein after a printed copy of a practice worksheet file is administered to the student, the evaluation areas of the printed copy are marked with evaluation marks by a human evaluator in accordance with the human evaluator's evaluation, and the updated evaluation data is based on the evaluation marks.

The present disclosure is also directed to an individualized practice worksheet printed on a paper substrate that is administered to a student for the student to mark with at least one mark responsive to selected problems included in the worksheet. The student's marks are evaluated by a human evaluator. The worksheet includes machine readable identification data identifying the worksheet and the student and a human readable presentation of each selected problem. The problems are selected from a collection of problems based on evaluation data associated with the student. Each problem presentation includes at least one evaluation area for the human evaluator to mark with machine readable evaluation marks that indicate results of the human evaluator's evaluation. The worksheet is scanned by a scanner device for generating a digital document that corresponds to an image of the scanned worksheet. A processing device accesses the digital document, reads the machine readable evaluation marks, and uses the read evaluation marks to update the evaluation data associated with the student.

Other features of the presently disclosed worksheet generator system will become apparent from the following detailed description, taken in conjunction with the accompanying drawings, which illustrate, by way of example, the presently disclosed worksheet generator system.

BRIEF DESCRIPTION OF THE DRAWINGS

Various embodiments of the present disclosure will be described below with reference to the figures, wherein.

DETAILED DESCRIPTION

Figure 1:
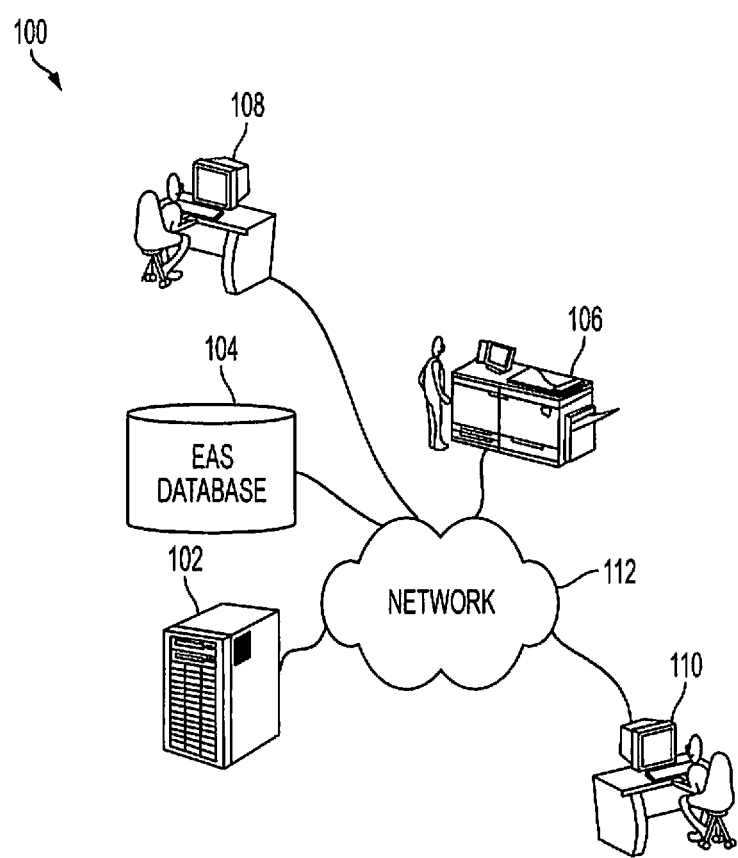
FIG. 1 is a schematic diagram of an exemplary academic worksheet generator system in accordance with the present disclosure.

Referring now to the drawing figures, in which like references numerals identify identical or corresponding elements, the worksheet generator system and method in accordance with the present disclosure will now be described in detail. With initial reference to FIG. 1, an exemplary academic worksheet generator system in accordance with the present disclosure is illustrated and is designated generally as worksheet generator system 100.

Worksheet generator system 100 includes a server 102, data storage facility 104, at least one multifunction device (MFD) 106 and first and second workstations 108 and 110. Each of the components of worksheet generator system 100 is in data communication with at least one of the other components via network 112.

The server 102 receives evaluation data associated with at least one previous academic practice worksheet completed by a student and uses that evaluation data to generate a new academic practice worksheet for the student. The server 102 may also generate the worksheet based on characteristics of the student, including granular assessment data (described in U.S. patent application Ser. Nos. 12/339,979, 12/340,054, 12/340,116) related to the student's past academic performance, the student's likes and preferences (as described further below), the student's risk ratio (as described further below), and adjustable features that the teacher requesting generation of the worksheets can select.

Figure 3:
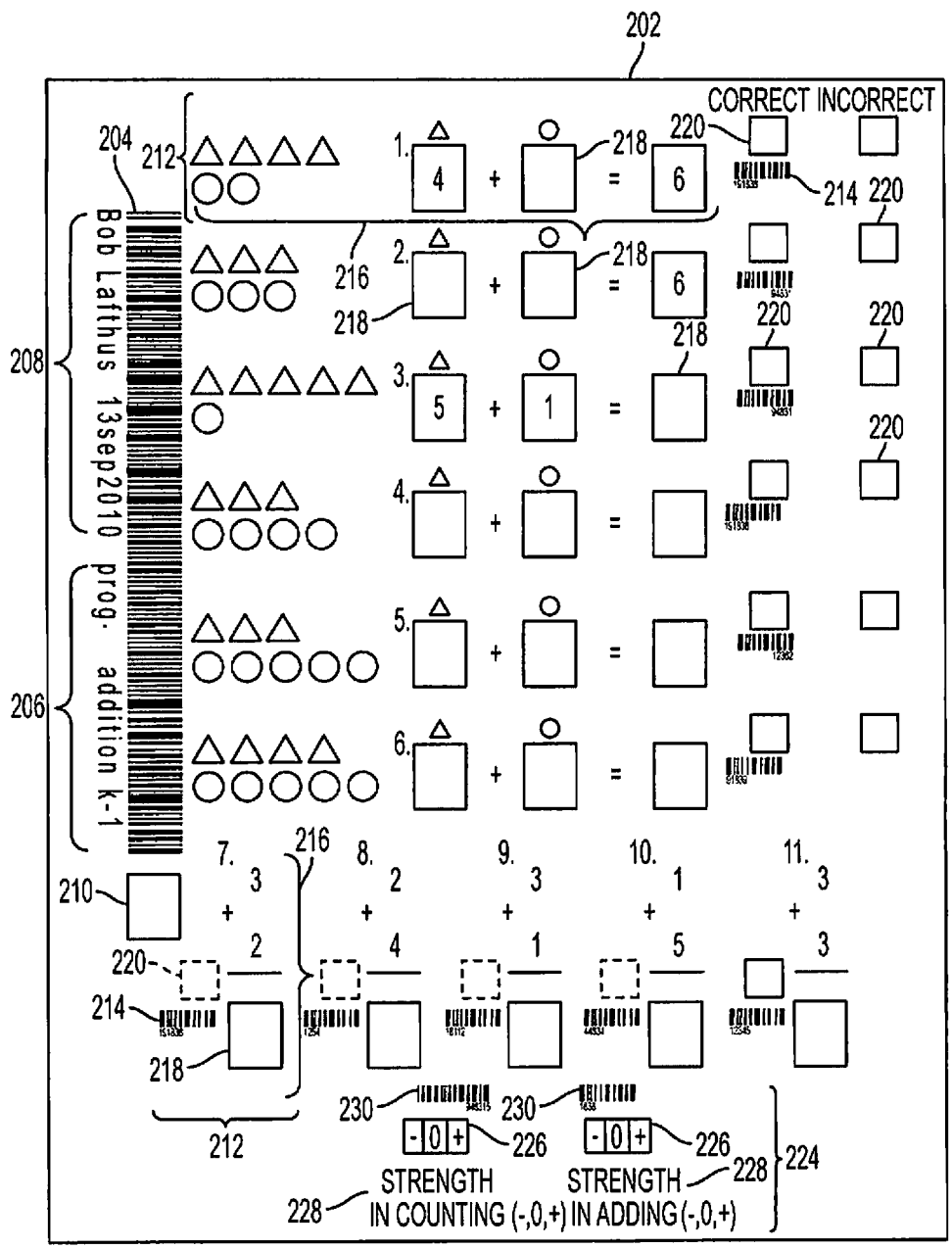
FIG. 3 shows an exemplary practice worksheet generated in accordance with the present disclosure.

The term "academic practice worksheet" (also referred to as "worksheet" or "practice worksheet") here includes at least one substrate, such as paper, that has at least one problem marked on it. An exemplary worksheet 202 having a plurality of problems 212 is shown in FIG. 3. The term "problem" is applied broadly herein to refer to a question or a prompt for a student to respond to. The problem 212 is designed to gauge the student's progress with respect to an academic skill related to an academic topic, e.g., by performing a task related to at least one of addition, division, reading comprehension, spelling, grammar, etc. Each problem 212 is targeted to exercise one or more specific academic skills at a level in accordance with the student's progress through a progression, and at a specific difficulty level. The problems 212 may be presented to the student in a variety of ways and may prompt the student to provide a response to the problem 212 in a variety of ways. For example, the student may be prompted to mark a response by circling a correct answer, matching items from two columns, filling in a blank, adding punctuation marks to a text sample, etc.

A worksheet is administered to the student by providing the student with a paper copy of the worksheet. The student completes the worksheet, including marking the worksheet with strokes (e.g., hand drawn strokes using a writing instrument, such as a pencil, crayon or pen) that indicate responses to each of the problems 212 provided by the worksheet. Typically, there are indicators to the student, explicit or implied, that instruct the student where and how to mark a stroke when responding to a problem 212.

The teacher administering the worksheet can observe the students as they complete their respective worksheets. Thus, the classroom operates in accordance with conventional classroom protocol, and the teacher can gain insights into the student's abilities, progress, and struggles by observing them as they work. When the teacher observes that a student has completed a worksheet, or time for completion has expired, the teacher evaluates the student's work and marks the worksheet with evaluation marks. The worksheet and problems 212 are formatted and laid out in a manner that make it straight forward for the teacher to observe how the student answered and to evaluate it. The teacher may use a tool, such as a handheld version of the second workstation 110, to assist with evaluating, when the need arises, such as a calculator or a handheld computing device that can access the proper responses to a specified problem 212 (identified via its ID or the ID of the worksheet) or a common error associated with an incorrect response.

The teacher marks the evaluation marks on the worksheet in a manner that the server 102 will be able to read and interpret. In order to help the teacher to make the evaluation marks so that they will be machine readable, the worksheet may explicitly or impliedly indicate to the teacher how and where to make the evaluation marks. The teacher may further write or draw annotations on the worksheet, such as a "smiley," a comment "big improvement," etc. to provide feedback to the student and/or the student's parents.

After the paper worksheets 202 for one or more students are marked up by the students and by the teacher, they are submitted to the MFD 106, such as an associated scanner device 124 located in the teacher's classroom, which scans each worksheet 202 and generates and stores a corresponding digital file (e.g., image data, such as a .pdf or .tif file) that is associated with the corresponding student. The marked and annotated worksheets 202 may be returned to the students for each student to take home, e.g., to show to his or her parents.

The stored worksheets 202 are evaluated by the server 102, which includes retrieving evaluation marks that were made by the teacher from the generated digital file, processing the retrieved evaluation marks, and generating and storing corresponding evaluation data. The stored evaluation data is used for determining how much the student has progressed and selecting problems 212 for the next worksheet to be generated. The problems 212 are selected in accordance with the student's performance on the previous worksheet(s), the appropriate progression and difficulty level for the student, and the student's risk tolerance. Also, the problems 212 selected for the next worksheet may be personalized with favorite items of the student.

The evaluation data and/or the problems 212 selected for the next worksheet may be viewed, validated, and/or annotated by the teacher, e.g., via the second workstation 110. The teacher may submit suggested changes to the evaluation data via second workstation 110 or by re-marking and resubmitting the worksheet 202 to the server 102, e.g., for reevaluation. The server 102 may generate reports relating to the evaluated and/or validated worksheets. The teacher may also submit suggested changes to the next worksheet 202 via second workstation 110.

Figure 2:
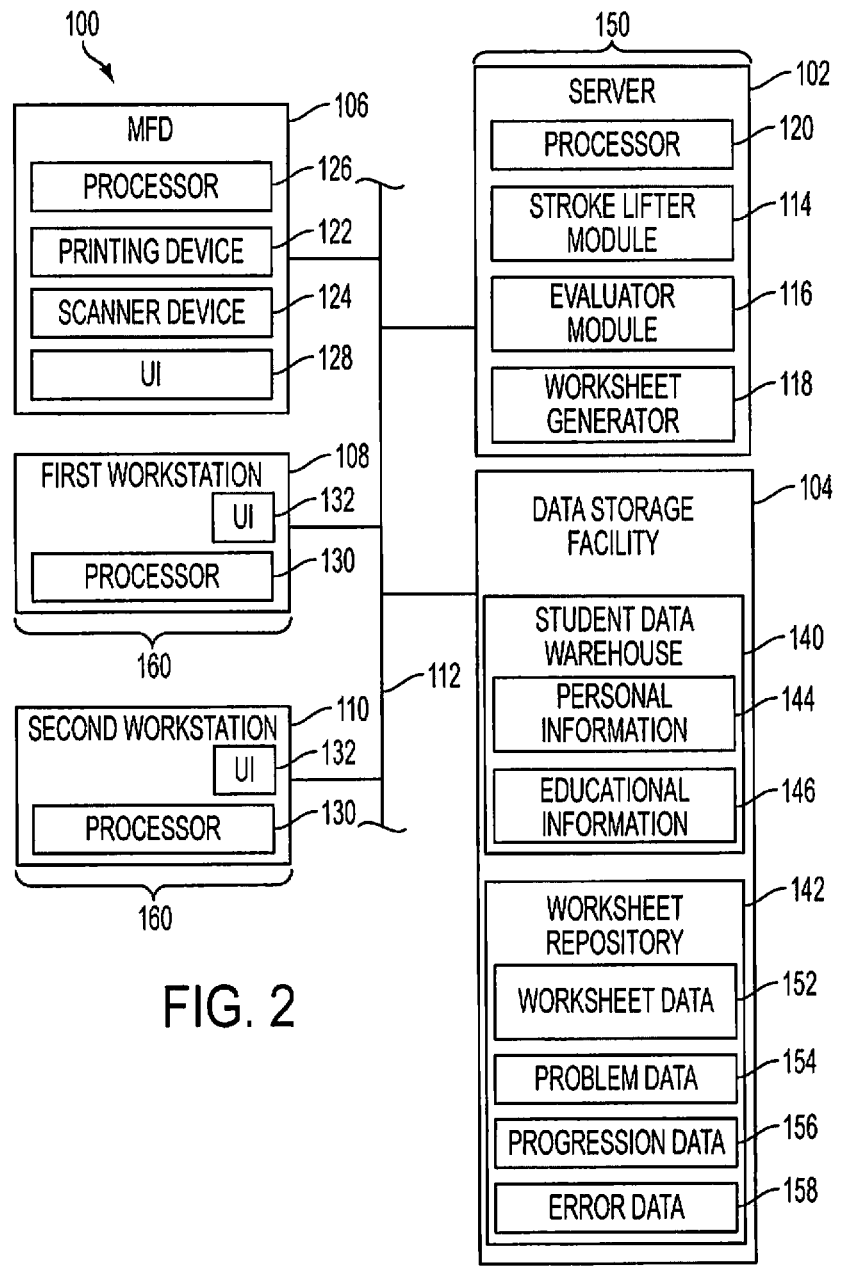
FIG. 2 shows a detailed block diagram of the components of the worksheet generator system shown in FIG. 1 in accordance with the present disclosure.

Referring to FIG. 2, the server 102 is a computing device having a hardware processor 120 (e.g., a microprocessor or CPU); at least one storage device (e.g., RAM, ROM, flash memory, removable memory, etc.), and all necessary communication devices for communicating with the data storage facility 104, MFD 106, and/or first or second workstations 108 and 110, either directly or via the network 112. The server 102 may include a web server, a server, a minicomputer, a mainframe computer, a personal computer, a mobile computing device, etc.

The processor 120 executes a stroke lifter software module 114, granular assessment evaluator software module 115, practice worksheet evaluator software module 116, and a practice worksheet generator software module 118, each of which is described further below. The stroke lifter software module 114, worksheet evaluator software module 116 and a worksheet generator software module 118 each include a series of programmable instructions capable of being executed by the processor 120. The series of programmable instructions can be stored on a computer-readable medium accessible by the processor 120, such as RAM, a hard drive, CD, smart card, 3.5" diskette, etc., for performing the functions disclosed herein and to achieve a technical effect in accordance with the disclosure. The functions of the stroke lifter software module 114, practice worksheet evaluator software module 116 and a practice worksheet generator software module 118 may be combined into one module or distributed among a different combination of modules and/or among different servers.

The data storage facility 104 includes at least one nonvolatile storage device for storing information that the server 102 needs to access for making requested recommendations. In the current example, the data storage facility 104 includes a first storage device for storing a student data warehouse 140 and a second storage device for storing worksheet repository 142. Software necessary for accessing data in the data storage facility 104, including retrieving data, manipulating data and storing data, may be included with the server 102 and/or the data storage facility 104. The server 102 and the data storage facility 104 may be configured as one component or may be configured as separate components which are in data communication.

The data storage facility 104 may be a central database, a distributed database, or may include local storage associated with one or more of the components (e.g., server 102, MFD 106, and first and second workstations 108 and 110) of the worksheet generator system 100. The components may share information, such as worksheets 202, scanned worksheets 202, validated worksheets 202, evaluated worksheets 202 and reports related to evaluations of worksheets 202, by storing information on and retrieving information from data storage facility 104. The method of sharing information may be done in a number of ways, such as a first component notifying a second component when a particular file is available for the second component to retrieve or process, the first component sending the file to the second component, or the second component checking the data storage facility 104 at regular intervals for files that it needs to retrieve for processing.

The student data warehouse 140 stores personal information 144 and educational information 146 associated with each student. The personal information 144 includes, for example, name, address, age, ethnicity, gender, class, teacher, hobbies, favorite personal item data, such as for specifying the student's favorite sports, music genres or musical selections, books, hobbies, and/or interests, etc. The educational information 146 includes, for example, evaluation data; granular data, and ID codes associated with previously administered assessments; student's academic grades per semester; the student's current progression level; performance ratings per academic behavior (e.g., paying attention, complying with classroom rules, etc.); favorite educational item data; worksheet generation preference data; etc.

The student's current progression level includes a current progression level for each academic skill the student is being instructed and exercised in using the worksheets 202, and further includes a mastery level for the current progression level. The mastery level is based on the evaluation data associated with problems 212 recently presented to the student for the current progression level, and may be expressed, for example, as a ratio of correctly answered problems 212/incorrectly answered problems 212. The progression data may further include information such as the date when the current and/or previous progression levels were introduced to the student, a date when instruction for each of those progression levels was completed, and a mastery level achieved for each of those progression levels.

For each worksheet 202 that was administered to the student and scanned by MFD 106, the evaluation data associated with a student includes the processed results of evaluation marks that were lifted from the digital file generated by MFD 106. After the evaluation marks are lifted they are processed. In the present example, the lifting and processing includes determining if a mark, such as a slash, is present or absent in a selected location of a digital file of image data. The evaluation result (correct, incorrect, needs more practice, etc.) is generated based on the presence or absence of the mark in each location. Alternatively, the lifted marks may be processed using Intelligent Character Recognition (ICR) to determine the meaning of the lifted marks. ICR here refers to using an intelligent version of optical character recognition for recognizing handwritten characters. The evaluation result is generated based on what ICR indicates the teacher communicated via the teacher's evaluation marks. The evaluation result for each mark is stored with the evaluation data. Thus, the evaluation data indicates which problems 212 the teacher marked as correct or incorrect and any additional teacher evaluation information, such as which academic skills the student needs to practice more or which common errors the student made.

The granular data includes data describing the student's performance on previously administered assessments which is described in related U.S. patent application Ser. Nos. 12/339,979, 12/340,054, 12/340,116, and 12/640,426, which are all incorporated herein by reference.

The progression data 156 in the present example includes a plurality of progressions. The progressions are ordered along progression paths relative to one another. Alternative progression paths may be available and selectable. For example, a progression for teaching single-digit addition may precede a progression for teaching single-digit subtraction, but a teacher may select to reverse this order.

In the current example, each progression includes a path of at least two ordered levels. Each level (also referred to as a progression level) may have a path of ordered sub-levels. Each sub-level may further have a path of ordered sub-levels, etc. Each level or sub-level of a progression may include a family of least one problem 212. Problems 212 within a family of problems 212 are related to comparable skills and have a comparable degree of complexity. These problems 212 are referred to as parallel problems 212. When a progression has multiple ordered paths of levels, the multiple ordered paths of levels may be nested. A student is assigned a current level, and in accordance with the student's evaluation data the student advances or retreats along the path that the student's current level is located on.

Each progression and level may be identified by an ID code or a descriptor (e.g., progression descriptors: math, grammar, spelling, social studies; level descriptors for the "math" progression: add whole numbers, subtract whole numbers, add integers, subtract integers; sub-level descriptors for the "add whole numbers" level: i) counting objects; ii) recognizing that groups of objects can be added together to form a larger group whose sum is the total of items in each group; iii) adding numbers 1-5; iv) counting by groups of 1s, 10s, 100s; v) adding zero or one to any number; and vi) adding numbers 0-9.

Subsequent levels along a path may represent a progression in skill or a progression in complexity using the same skill. A progression in skill is demonstrated by the path along sub-levels i-vi above. A progression in complexity is demonstrated wherein sub-level vi above may have first and second sub-sub-levels, progressively more complex. The first sub-sub-level includes all of the problems 212 having solutions which yield a one-digit answer, and the second and more complex sub-sub level includes all of the problems 212 having solutions which yield a two-digit answer.

The favorite educational item data includes the students most favorite and least favorite academic topics or skills. This data may be obtained from the student's own ratings of what topics the student most prefers or least prefers, or based on data gathered about the student's performance or activity level in various academic topics, such as academic skills that the student has scored well in or progressed quickly in; or an academic topic that a student has recently written a research report on (such as China or spiders).

The worksheet generation preference data includes, for example, evaluation range; selection criteria; and risk tolerance data. The evaluation range includes the number of recently administered worksheets 202 or the date range for administration of worksheets 202 for which evaluation data will be used to select problems 212 for a new worksheet 202 that is being generated. The evaluation range may be selectable by the teacher, else a default value is used.

In the present example, the selection criteria include the total number of problems 212 to be included in the worksheet 202, a review ratio, a challenge ratio, and time constraints. The review ratio defines the ratio of the number of problems 212 associated with a selectable range of levels that precede the student's current level relative to the number of problems 212 associated with the student's current level. The challenge ratio defines the ratio of the number of problems 212 associated with a selectable range of levels that follow the student's current level relative to the number of problems 212 associated with the student's current level. The time constraints provide instructions to the teacher administering the worksheet 202 if the worksheet 202 or a portion of problems 212 included in the worksheet 202 are to be administered under timed conditions for exercising the student's speed and fluency.

The risk tolerance data is used to initialize a student's current progression level per academic topic and to recalculate the student's current progression level based on evaluation data from worksheets 202 administered to the student. The risk tolerance data may be selected by the teacher, default values may be used, or the data may be set based on an analysis of the student's past performance. Different risk tolerance data may be used for different academic skills, for example when a student exhibits a low frustration level for one academic skill but prefers challenge in another academic skill. Alternatively, the same risk tolerance data may be used for the student for all academic skills. In the present example the risk tolerance data includes selectable thresholds, Init Threshold 1 and Init Threshold 2 which are used for determining an initial progression level, and Advance Threshold 1 and Advance Threshold 2 for determining when and to what progression level to advance the student to. The worksheet generator module 118 executes an algorithm, such as advancing algorithm (see Equation (1) below), to determine at which progression level to initialize or advance the student to. Other variations of risk tolerance data and algorithms that selectably adjust the rate at which the student is progressed through the progressions are envisioned, and the present disclosure is not limited to the risk tolerance data and advancing algorithm described herein.

Worksheet repository 142 stores, for example, worksheet data 152, problem data 154, progression data 156, and error data 158. The worksheet data 152 may include the ID code of the worksheet 202, ID codes of each problem 212 included with the worksheet 202, ID codes of each student who was administered the worksheet 202, and evaluation data related to the student's overall performance on the worksheet 202.

The problem data 154 includes a bank of problems 212. Each problem 212 may be stored as a data file, record or field. Associated with each problem 212 is an ID code identifying the problem 212; a progression description sufficient to describe the problem's 212 position relative to the levels and sub-levels of at least one progression and identifies the progression; a presentation of the problem 216, namely specifying how the problem 212 will be printed and appear on the worksheet 202; the correct response; ID codes of common errors associated with the problem 212; or common errors that may be associated with incorrect responses that a student may mark. The progression description may specify one or more progressions, levels, and sub-levels that the problem 212 is associated with, such as by an ID code identifying the progressions or levels; or a descriptor that describes a level or sub-level and its position in a progression, e.g., math/whole numbers/addition, 0<(2 addends)<6, which describes all problems 212 associated with adding two numbers, with each of the numbers ranging between 1-5. The error data 158 includes a bank of common errors. Associated with each common error is an ID code associated with the common error; a presentation of the common error (e.g., a textual description); and problem ID codes that the common error can be associated with.

The MFD 106 includes a printing device 122, one or more scanner devices 124, a processor 126, a user interface (UI) 128, and all necessary communication devices for communicating with the data storage facility 104, server 102, and/or client computing device 108, either directly or via the network 112. The printing device 122, scanner device 124, and processor 126 may be integrated and housed in a single housing or may be separate components which are interfaced to one another. The printing device 122 includes any apparatus or system, such as a digital copier, xerographic printing system, ink jet printing system, reprographic printing system, bookmaking machine, facsimile machine, etc., which performs a marking output function for any purpose. The modality for marking may include, for example, applying toner, ink, dye, etc., to a substrate. The substrate may be a material such as paper, cardboard, a transparency, a paper derivative, etc.

The scanner device 124 of the MFD 106 includes hardware and software for imaging a document and generating corresponding imaging data. A scanner device 124 may be provided in each classroom of a school building so that the teacher can submit worksheets to the scanner without leaving the classroom. The scanner devices 124 may be stand-alone devices or may be in communication with network 112 and/or one or more of the devices that are in communication with network 112. Each scanner device responds to a request to scan a document by imaging the document and generating a corresponding digital file of image data. The image data may be stored locally or in a central location, e.g., in the associated student's educational information 146 of data storage facility 140, that is accessible to processor 120 of server 102. In either case, the image data is submitted to or accessible by the server 102.

Each of the first and second workstations 108 and 110 is a computing device, such as personal computer or a mobile computing device, having a hardware processor 130 (e.g., a microprocessor or CPU); a UI 132; at least one storage device (e.g., RAM, ROM, flash memory removable memory, etc.), and all necessary communication devices for communicating with the data storage facility 104, MFD 106, and/or server 102, either directly or via the network 112. The UI 132 includes a user input device, such as a keyboard, keypad, touchpad, mouse, touch screen or the equivalent, and a display device, such as indicator lights, a display screen, etc. The UI 132 may provide a GUI via which the user may enter and receive information. The processor 130 may communicate with the server 102, data storage facility 104, and/or MFD 106, for receiving input from and generating output to a user via the UI 132, and to process data for generating worksheets 202. The first and second workstations 108 and 110 may further be provided with the ability to access the answer to one or more specified problems 212.

The network 112 may be the Internet, an intranet, an Ethernet, a LAN, a WAN, or other means for providing data communication between a plurality of digital devices. It is also envisioned that the data communication between any of the components of the worksheet generator system 100 may be via a direct connection which may be wired or wireless. In the present example, the network 112 is the Internet.

With reference to FIG. 3, an exemplary worksheet 202 is shown. The exemplary worksheet 202 is provided with machine readable identifying information 204, including a worksheet identification (ID) code 206, a student ID code 208, and a time or date stamp 210. The worksheet ID code 206 identifies the worksheet 202 so that data may be stored in association with the worksheet 202. The machine readable data is scanned by the MFD, interpreted by the server 102 and stored in the data storage facility 104.

The worksheet 202 is provided with the presentation 216 of one or more problems 212. Each problem 212 may have associated with it an ID code, a presentation of the problem 216, a problem template, a student response area 218, and a teacher evaluation area 220. The problem's ID code may be displayed an optical code 214 adjacent to the problem 212. The ID code 214 identifies the problem 212. The ID code 214 may be an optical code, such as a barcode, or it may be an alphanumeric code. If the data storage facility 104 stores the ID code 214 of all of the problems 212 associated with the worksheet 202, then the ID codes 214 may be omitted from the worksheet 202. The problem template describes the layout requirements of the problem presentation 216 and the location relative to a predetermined reference location (such as the top left corner of the problem presentation 216) that an evaluation area 220 is located in. Additionally, the problem template includes a set of rules, described as the problem rubric, for processing the marks that are found to be present of absent in evaluation areas 220. The problem template may be associated with the problem 212 and stored in a variety of ways, such as stored in an associated separate file, record, or field or provided as associated metadata. The presentation of the problem 216 is not limited to a particular format. It may be textual, a presentation of a mathematical equation to be solved, graphical, etc. The presentation of the problem 216 may include explicit instructions for how to respond to the problem 212, or the instructions may be implied.

The student response area 218 provides an area for the student to mark a response to the problem 212. The format for the response area 218 and the student response is not limited and may overlap with the presentation of the problem 216. For example, the problem 212 may ask the student to enter a response by: annotating (e.g., underlining, circling, drawing a slash through a selection, adding punctuation marks, etc.) text presented with the problem 212; selecting a choice from multiple choices; filling in a blank; matching items from two columns; drawing a picture; writing out a mathematical computation, e.g., a long-division problem; etc. The student response area 218 is set up so that when the student enters a response in the student response area 218, a teacher can recognize the response and be able to evaluate it for correctness. The teacher may use the first or second workstation 108 or 110, such as configured in the form of a handheld or desktop device, to look up answers to a specific problem 212 or worksheet 202 to help the teacher evaluate the student responses. In this way, the teacher may evaluate the students' performance as the teacher walks around the room or as the students bring their completed worksheets 202 to the teacher at the teacher's desk.

The student response area 218 may be defined by a marking that is visible to a viewer, such as the student or the teacher. The definition of the student response area 218 merely needs to be sufficiently apparent to the student so that the student knows where to make a mark, and to the teacher so that the teacher knows where to look for it. In the example shown, for the first problem 212 the student response area 218 is visually indicated with a blank square. The student therefore knows where to make a mark to indicate the answer, and the teacher will recognize the mark as the answer.

To illustrate a problem's 212 relationship to a progression and a level, in the current example, problems 1-6 of worksheet 202 shown in FIG. 3 are associated with the progression path "math/add whole numbers/level ii) recognizing that groups of objects can be added together to form a larger group whose sum is the total of items in each group." Problems 7-11 of the same worksheet 202 are associated with the progression path "math/add whole numbers/level iii) adding numbers 1-5."

The teacher evaluation area 220 provides a location for a teacher to evaluate a problem 212 for correctness, e.g., to mark the student response as right or wrong. In the present example, the teacher marks worksheet 202 with evaluation marks that correspond to the teacher's evaluation. The server 102 processes the scanned in worksheet 202 and locates, reads, and stores the teacher's evaluation marks entered in the teacher evaluation area 220. In problems 1-6, but without limiting the disclosure thereto, the worksheet 202 is provided with specific locations for the teacher evaluation marks, where the presence or absence of a mark at the location provides evaluation information (e.g., if the problem was answered correctly or incorrectly) that is stored as evaluation data. The evaluation data is stored and associated with the student, the problem 212 and/or worksheet 202, and the date or time that the worksheet 202 was created or administered. In problems 7-11, evaluation marks marked within evaluation areas 220 may need to be processed with ICR to determine evaluation information indicative of how the student performed on the problem.

The teacher evaluation area 220 may include sub-areas that can be marked by the teacher to provide additional information about how the student answered the problem 212 or about the student's progress. For example, a check box may be provided for each of a variety of errors that are commonly made by students when executing the academic skill exercised in problem 212 or to indicate that the student needs more practice in a particular area. For example, if the problem 212 requires the student to solve a two or three digit multiplication problem a check box may be provided for common errors associated with this academic skill, such as a carrying error, specific digit multiplication error, digit alignment error, digit reversal error, or digit addition error. Accordingly, detection of the absence or presence of an evaluation mark, such as a slash, in these check boxes indicates which errors the student made.

Figure 4:
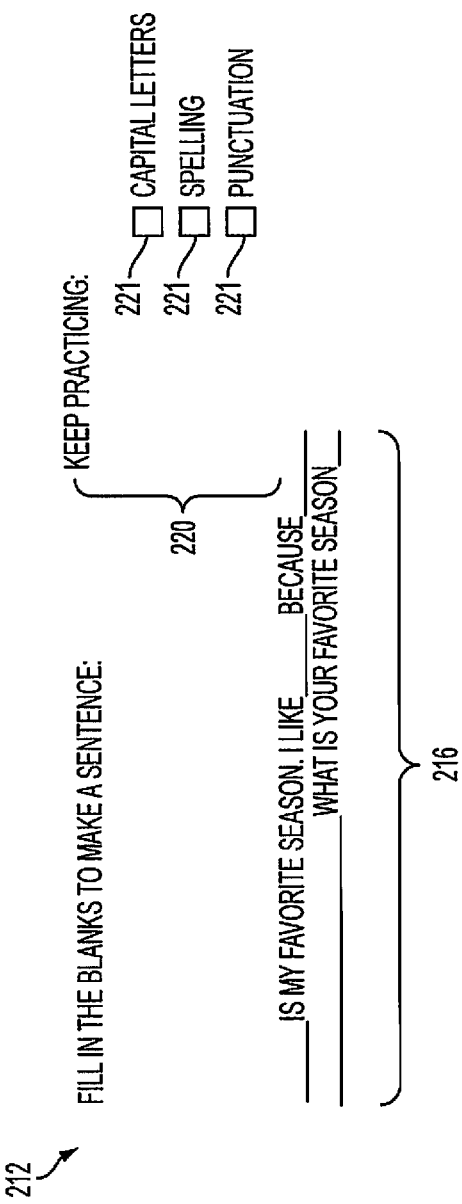
FIG. 4 shows an example of different configuration for a teacher evaluation area associated with an exemplary problem included in the worksheet shown in FIG. 3.

Another example of a teacher evaluation area 220 associated with an exemplary problem 212 is shown in FIG. 4. The presentation of the problem 216 includes several blank lines for the student to fill in. The teacher evaluation area 220 includes three labeled check boxes 221 for the teacher to mark in accordance with the teacher's evaluation. Using the check boxes 221, the teacher can indicate by checking one or more of the sub-evaluation areas whether the student needs to keep practicing any combination of proper use of capital letters, spelling, or punctuation. Accordingly, detection of the absence or presence of an evaluation mark, such as a slash, in these check boxes 221 indicates in which academic the student requires additional practice.

The worksheet 202 may further include an additional teacher evaluation area 224 that can be marked by the teacher to provide additional information about how the student performed overall on the worksheet 202. A collection of evaluation areas 224 may be stored e.g., in a file, record, or field, with the problem data 154. The additional information may include the teacher's opinion about whether the student needs more practice with an academic skill or area, needs more or less time to complete the worksheet 202, needs to be progressed more quickly through the academic skills, shows signs of reaching a frustration level due to the quantity or complexity of the problems 212, shows signs that faster progression through the material would be beneficial, etc. Some of this information may come from observations of the student that the teacher makes while the student is doing the worksheet 202, such as if the student appears unconfident, erases frequently, appears frustrated due to difficulty, appears frustrated due to lack of challenge, does not have enough time to complete the work, completes the work well before the time limit is reached, etc.

One or more check boxes 226 may be provided in the teacher evaluation area 224 that the teacher can mark. Each check box 226 may be provided with an explanation 228 that explains to the teacher what the check box 226 should be used for and how to indicate an answer.

In the example provided the check boxes are used for the teacher to provide an opinion of the student's strength in the skill areas of counting and adding based on the teacher's observation of the student's behavior as the student executed the worksheet 202 and/or the teacher's evaluation of the types of mistakes that the student made. Checkbox 226 includes the symbols "−," "0," and "+" for the teacher to select by placing a slash through the selected symbol, respectively. In the current example, the symbols "−," "0," and "+" indicate, respectively, that based on the teacher's observations the student needs more practice and to progress more slowly, that the student's progress rate should not be altered, or that the student should be progressed more quickly. Using a slash to indicate a selection provides for robust detection of the mark. Detection of the presence or absence of an evaluation mark, such as a slash, in these check boxes 226 indicates the student's strength in the areas of counting and adding.

Alternatively, the checkbox 226 could provide space for the teacher to write in a symbol or a comment. After extraction, the teacher's marks would need to be processed using ICR. The results of the ICR should be verified by the teacher, e.g., via second workstation 110.

The evaluation area 224 includes an associated evaluation area template that describes the layout requirements of the evaluation area presentation and the location relative to a predetermined reference location that checkboxes 226 are located in. Additionally, the evaluation area template includes a set of rules, described as the evaluation rubric, for processing the marks or absence of marks in the check boxes 226. The evaluation template may be associated with the evaluation area 224 and stored in a variety of ways, such as stored in an associated separate file or field or provided as associated metadata.

The number of check boxes 226, the usage of evaluation marks extracted from the check box 226, and the different marks that may be used to indicate teacher evaluation result may vary from worksheet 202 to worksheet 202. An ID code associated with each check box 226 or evaluation area 224 may be displayed as optical code 230 adjacent to the check box 226 or evaluation area 224.

The worksheet 202 may have an associated worksheet template that includes the identification code for each problem 212 and evaluation area 224 included in the worksheet 202. The template may further include a worksheet layout which describes the layout for all of the information to be printed on the worksheet 202, including the presentation of the problems 212, evaluation area 224, and identifying information 204.

Figure 5:
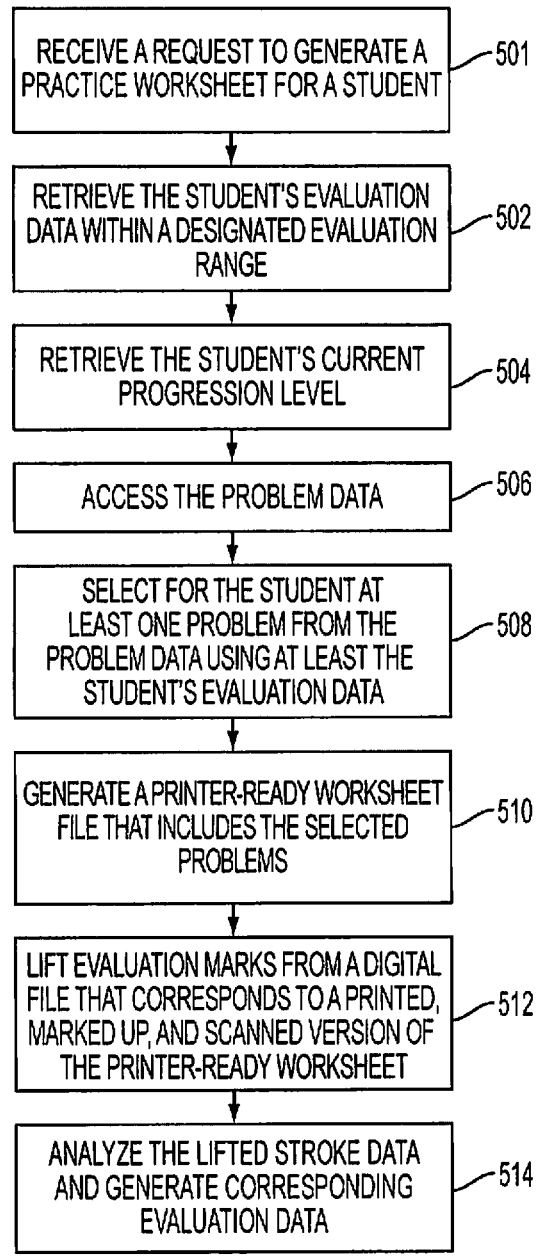
FIG. 5 shows a flowchart of a method for generating academic worksheets in accordance with the present disclosure.

With reference to FIG. 5, the method of generating a worksheet 202 for a student, processing the administered and teacher-evaluated worksheet 202 and using the evaluation data to generate a subsequent worksheet 202 is now described. Before a first worksheet 202 is administered for each academic skill that will be exercised using worksheets 202, the teacher determines an initial level for that academic skill. The teacher may do this by administering an initialization worksheet, for example as a survey-based worksheet that includes problems 212 from a wide variety of levels of progression within that skill, or as a worksheet that includes problems 212 from one level or only a few closely related levels. The teacher evaluates the initialization worksheet and the results of the evaluation are used to determine the initial progression and level within the progression at which the student will be initialized. The student's risk tolerance data may be used together with the results of the evaluation to determine an initial progression and level.

More specifically, the worksheet generator module 118 determines the student's initial current level for each academic skill using the advancing algorithm in Equation (1), wherein Threshold 1=Init Threshold 1 and Threshold 2=Init Threshold 2 and Init Threshold 1 and Init Threshold 2 are provided by the risk tolerance data, and the Student Performance Level (SPL) is determined by the student's performance on the initialization worksheet for each academic skill. When using the survey-based worksheet the worksheet generator module 118 may determine the highest level from the various levels included in the survey-based worksheet that meet the criteria of the advancing algorithm.

The method shown in FIG. 5 assumes that the student's initial progression and level were determined and that the student has since been administered at least one worksheet 202. The method refers to generating a new worksheet 202 for the student using evaluation data that has been generated for one or more of the most recently administered worksheet 202.

At step 501, the worksheet generator module receives a request to generate a practice worksheet 202 for a student for one or more requested academic skills. The request may have been generated by a teacher via workstation 108 or 110. At step 502, the worksheet generator module 118 retrieves the student's evaluation data from within the selected evaluation range which is stored with educational information 146. At step 504, the worksheet generator module 118 retrieves the student's current progression level per requested academic skill. Additional data from the student's personal information 144 and educational information 146 may also be accessed and used as described further below.

At step 506, the worksheet generator module 118 accesses the problem data 154. At step 508, the worksheet generator module 118 selects for the student at least one problem 212 from the problem data 154 using the accessed evaluation data. The selected problems 212 each have an associated ID code which is associated with the ID code assigned to the worksheet 202 being generated. The worksheet generator module 118 determines whether to advance or retreat the student's current level based on the accessed evaluation data. In the current example, the determination is performed using the advancing algorithm in Equation (1), wherein Threshold 1=Advance Threshold 1 and Threshold 2=Advance Threshold 2, and Advance Threshold 1 and Advance Threshold 2 are provided by the risk tolerance data. In another example, the decision of whether to advance or retreat and by how much is made by the teacher when generating a specific worksheet 202 or in general for generating any worksheet 202, or automatically based on data associated with the student, such as the student's prior performance when challenged by advancing level(s), or when not advanced or having retreated one or more levels. The evaluation data includes SPL, which in the current example is the percentage of problems 212 included in the evaluation range that are at the student's current level which the student answered correctly.

a. SPL>Threshold 1→Advance student's current level
        to next level b. Threshold 2>SPL>Threshold 1→Keep student's
        current level and use parallel problems 212 c. SPL<Threshold 2→Retreat student's current level
        to previous level                           EQUATION (1)

The steps of advancing the student's level to the next level or retreating the student's current level to a previous level include accessing the progression data, locating the student's current level in the progression data, and following the path that the current level is located along in an advancing or retreating direction or selecting parallel problems 212 at the student's current level. Advancing the student's current level beyond the final level of the student's current progression includes advancing to the first level of the next progression, as designated by the progression data. Likewise, retreating the student's current level beyond the first level of the student's current progression includes retreating to the final level of the previous progression, as designated by the progression data. When not advancing or retreating relative to the student's current level, but maintaining that level, problems 212 parallel to previously selected problems 212 are selected. When selecting parallel problems 212, only parallel problems 212 that have not yet been presented to the student may be selected, as desired. The teacher may also designate via the risk tolerance data and based on the student's evaluation data that the student may advance or retreat by more than one level at a time, or skip progressing through the sub-levels of a level or the levels of a progression.

Additionally, the selection of problems 212 to include in the worksheet 202 is made based on the selection criteria that may be selectable by the teacher. If the selection criteria are not selectable or no selection has been made, then default selection criteria are used.

Evaluation areas 224 are also selected for inclusion in the worksheet, such as based on having an association with any of the selected problems 212 or as specified by the teacher.

At step 510, a printer-ready worksheet file is generated that includes the selected problems 212. Related data is associated with the printer-ready worksheet file. The related data may be associated with the printer-ready worksheet file and stored in a variety of ways, such as stored in an associated separate file or provided as associated metadata. The related data includes, for example, the worksheet ID code; ID codes of all of the selected problems 212; the student's ID code; a timestamp indicating the date and/or time that the worksheet file was generated; template data including evaluation mark location data indicating the physical location on the printed substrate that the evaluation marks are expected to be located at for each problem 212 and its associated evaluation area 220 and for each evaluation areas 224 and its associated check boxes 226, expected types of evaluation data (e.g., "√," "–," "0," "+"), and the mean associated with each of the expected types of evaluation data.

Generating the printer-ready worksheet file includes accessing the template data for each problem 212 and each evaluation area 224 and generating a worksheet template that describes the arrangement and layout of all of the elements to be included in the worksheet, including the selected problems 212. The layout is generated by using an algorithm that is well known to a person skilled in the art that solves the geometric problem of laying out the problems 212, evaluation areas 224, and identifying information 204 for printing in accordance with their individual layout requirements. Additionally, the problems 212 may be laid out for ordering them in accordance with their associated progression level, with easier problems 212 preceding harder ones. The printer-ready worksheet file includes instructions for printing the presentation of each selected problem 212, of each evaluation area 220, and each additional evaluation area 224.

The selected problems 212 may include an embedded adjustable item, e.g., an adjustable textual or graphic term, which can be replaced with a selected textual or graphic interest term, respectively, in accordance with the student's favorite item data. For example, with reference to the worksheet 202 shown in FIG. 3, the items to be counted in the problem presentation 216 for problems 1-6 are triangles and circles. The triangles and circles may be adjustable graphic terms that may be replaced by two different graphic interest terms selected from the student's favorite item data. For one student, the two different graphic interest terms may be frogs and salamanders. For another student, the two different graphic interest terms may be skis and ski boots.

Table A shows an illustration of three versions of an exercise that is included in one problem presentation 216. In each of the versions A, B, and C, an adjustable textual term was replaced with a textual interest term selected from the student data associated with three different students. The textual interest terms may have been adjusted, such as for conjugation or forming a plural. A database may be accessed for words, textual terms, graphics, etc. that are related to items, subjects, activities, etc. that are favorites of the student or are familiar to the student, such as based on the culture related to the student's ethnicity.

Additionally, a database of current items may be accessed for replacing an adjustable item. Such current items may include the student's current geographic location, the current season, the current or recent weather, current or recent news or sports events, or a current or recently studied academic topic.

TABLE A

| Version A |
|---|
| Underline nouns and circle verbs: |
| The volcano erupted. |
| The earth shook. |
| Dinosaurs roared and stomped on the ground. |
| Version B |
| Underline nouns and circle verbs |
| The rain stopped. |
| The world sparkled. |
| Unicorns ran and jumped over the rainbow. |
| Version C |
| Underline nouns and circle verbs |
| The tree fell. |

TABLE A-continued

The bugs jumped.
Birds squawked and flew to the sky.

The printer-ready worksheet file is printed. A printed copy of the worksheet 202 is administered to the student. The teacher evaluates the administered worksheet 202 and marks the evaluation areas 220 and additional evaluation areas 224 with evaluation marks in accordance with the evaluation. The evaluated worksheet 202 is submitted to MFD 106 to be scanned, e.g., at a local scanner device 124 located in the teacher's classroom. The MFD 106 generates a digital file that corresponds to an image of the evaluated worksheet 202.

At step 512, the digital file is processed by the stroke lifter module 114 to lift the evaluation marks that were marked by the teacher and to associate each lifted mark with the problem 212 that it is associated with or with the check box 226 and evaluation area 224 that it is associated with. The stroke lifter module 114 uses the template data to know which data from the digital file corresponds to the physical locations indicated by the template data and which problems 212 or additional evaluation areas 224 to associate the lifted strokes with. The stroke lifter module 114 generates lifted stroke data that is indicative of or describes each stroke that was lifted and the problem 212 or check box 226 and evaluation area 224 that it is associated with. In the present example, the stroke lifter module 114 lifts strokes only from selected locations that correspond to the locations of the evaluation areas 220, check boxes 226 and optical codes. The Related Applications enumerated above, and most particularly U.S. patent application Ser. No. 12/640,426, describe the method of stroke lifting in greater detail.

At step 514, the evaluator module 116 analyzes the lifted stroke data that is associated with each problem 212 and each evaluation area 224 and generates and stores corresponding evaluation data. In the present example this includes determining the presence or absence of marks in each evaluation area 220 and check box 226. In another example, the stroke lifter module 114 and the evaluator module 116 may lift and perform ICR for recognizing evaluation marks, such as a "√" or an "X," found in evaluation areas 220 and check boxes 226, ignoring small unintentional marks, such as small stray line at a box's periphery or a speck of dirt. Using template data associated with each problem 212 and evaluation area 224, the evaluator module 116 determines if the lifted stroke data associated with each problem 212 indicates a need for more practice or not (e.g., depending on if the problem 212 was answered correctly or not), and if the additional evaluation area 224 provides additional information about the student's performance or need for practice at a particular level.

The stroke lifter module 114 and the evaluator module 116 further lift, evaluate, and store data in the digital file corresponding to the worksheet ID code 206, student ID code 208, and a time or date stamp 210. Evaluation may include translating machine readable optical codes, such as barcodes, or using ICR to translate handwriting into the information they are conveying, such as the student ID code, the worksheet ID code, or the date. The evaluated information is stored with the related data.

The abilities of the stroke lifter module 114 and the evaluator module 116 to lift and evaluate the evaluation marks may be robust so that the teacher evaluation marks need not be very precise in shape, style, location, etc. Also, the worksheet 202 and the associated template data may provide for robust lifting and evaluating of evaluation marks. In the present example, robustness is achieved in evaluation areas 220 for problems 1-6, by providing separate check boxes for indicating when a problem is answered correctly or incorrectly. The evaluator module 116 evaluates these problems by determining the presence or absence of a mark in the "correct" and "incorrect" checkboxes 220. If both or neither are checked the evaluator module may set a flag so that a warning may be generated to the teacher will cue the teacher to perform a verification of the evaluation results.

However, in a different embodiment, the teacher evaluation areas 220 and 224 may be defined by a delimiter and/or label to indicate clearly to the teacher where to make the teacher evaluation mark. The delimiter may additionally be used by the stroke lifter module 114 to locate the evaluation mark, such as by optically locating the delimiter.

In one variation, the teacher may request that the worksheets 202 be individualized for clusters of students whose evaluation data indicates a selected degree of similarity. The teacher may select how many clusters should be formed in a class of students or a maximum and/or minimum number of students to include per cluster. The problems 212 selected for the generated worksheet 202 are associated to a level that is as close as possible overall to the current level of the students in the cluster. A system and method for determining a degree of similarity among clusters of students within a class, and for selecting academic material that is close to the performance level of students included in the cluster are described in greater detail in related U.S. patent application Ser. Nos. 12/339,979, 12/340,054, and 12/340,116.

In one embodiment of the worksheet generator system, the server 102 and data storage facility 104, referred to as the worksheet generation (WGS) provider 150, provide a service to a client 160. The client includes the MFD 106 and the first and second workstations 108 and 110. Each client 160 may gain access to the service provided by the WGS provider 150, such as by subscribing to the service and/or loading appropriate software onto at least one MFD 106 and/or first and second workstations 108 and 110. It is also envisioned that the WGS provider 150 provides a website that the client 160 can access and use to access the service provided by the WGS provider 150. The clients 160 may access the service for submitting a request for generation of a worksheet 202 or for evaluation data to be stored in the data storage facility 104.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A practice worksheet generator system for generating individualized educational practice worksheets for students, the system comprising:
   at least one processor;
   a memory with a first set of instructions that, when executed by at least one of the processors, generates an individualized practice worksheet by, for any student of a plurality of students:
   accessing evaluation data associated with at least one practice worksheet that was previously administered to the student,
   accessing a database of problems,
   selecting a plurality of problems from the database based on the evaluation data, and
   generating an individualized practice worksheet file for the student, wherein the file includes instructions for printing an individualized worksheet comprising the selected problems, a student response area for each selected problem, and a teacher evaluation area for at least one of the selected problems; and a memory with a second set of instructions that, when executed by at least one of the processors after a printed copy of the individualized practice worksheet is completed by the student and evaluated by a teacher:
receives an electronic file corresponding to the completed worksheet,
for each problem in the completed worksheet, determines whether the teacher entered any evaluation marks in the teacher evaluation area for the problem, and
updates the evaluation data based on the entered evaluation marks;
wherein the instructions of the individualized practice worksheet file for printing the teacher evaluation area for at least one of the selected problems comprise instructions to print:
a location for the teacher to evaluate the relevant problem for correctness, and
a sub-area for the teacher to provide additional information regarding an academic area in which the student requires additional practice;
wherein the instructions in the second set for determining whether the teacher entered any evaluation marks in the teacher evaluation area comprise instructions to determine whether the sub-area includes the additional information;
wherein the instructions in the second set for updating the evaluation data based on the entered evaluation marks comprise instructions to update the evaluation data based on the correctness and the additional information;
wherein the instructions in the first set for selecting the additional plurality of problems from the database based on the updated evaluation data comprise instructions to select at least one problem designed to exercise the academic skill for which the additional information indicates that the student requires additional practice; and
wherein after the system updates the evaluation data for the student, the first set of instructions causes at least one of the processors to generate a new individualized practice worksheet file for the by:
selecting an additional plurality of problems from the database based on the updated evaluation data, and
generating the new individualized practice worksheet file, wherein the new individualized practice worksheet file includes instructions for printing a new individualized worksheet comprising the additional selected problems.

2. The system of claim 1, wherein:
the academic area in which the student requires additional practice comprises proper use of capital letters, spelling, or punctuation;
the instructions in the second set for updating the evaluation data based on the entered evaluation marks comprise instructions to update the evaluation data to indicate that the student needs to keep practicing proper use of capital letters, spelling, or punctuation.

3. The system of claim 1, wherein:
the instructions of the individualized practice worksheet file further comprise instructions for printing at least one additional teacher evaluation area for the teacher to provide additional information about how the student performed overall on the worksheet, wherein the additional information comprises whether the student needs more practice with an academic skill or area, needs more or less time to complete the worksheet, needs to be progressed more quickly through academic skills, or shows signs of reaching a frustration level;
the instructions in the second set further comprise instructions to determine whether the additional area includes the additional information from the additional teacher evaluation area; and
the instructions in the second set for updating the evaluation data further comprise instructions to update the evaluation data based on the additional information from the additional teacher evaluation area.

4. The system of claim 1, wherein:
the instructions in the second set for determining whether the teacher entered an evaluation mark in the teacher evaluation area for the problem comprise instructions to:
recognize an evaluation mark and ignore unintentional marks,
process the recognized evaluation mark to determine a meaning of the recognized evaluation mark, and
generate an evaluation result comprising what the teacher communicated via the recognized evaluation mark; and
the instructions in the second set for updating the evaluation data comprise instructions to include the evaluation result in the evaluation data.

5. The system of claim 1, wherein:
each problem in the database is associated with a progression level; and
the instructions in the first set further for generating a new individualized practice worksheet comprise instructions to:
receive a request to generate a practice worksheet for one or more academic skills,
determine a progression level for the student for at least one of the academic skills, and
when selecting the additional plurality of problems, select the additional plurality of problems as those that are associated with the progression level of the student.

6. The system of claim 5, wherein the instructions in the second set further comprise instructions to determine whether to advance or retreat the student's progression level based on the evaluation data.

7. The system of claim 6, wherein the instructions to determine whether to advance or retreat the student's progression level within an academic skill further comprise instructions to:
receive risk tolerance data for the student, wherein the risk tolerance level describes the student's tolerance for being challenged with new or difficult academic skills; and
also base the determining whether the student should advance or retreat on the received risk tolerance data.

8. The system of claim 1, wherein:
at least some of the problems in the database include an embedded adjustable item; and
the instructions in the first set for selecting the plurality of problems or the additional plurality of problems comprise instructions to:
select a problem that includes an embedded adjustable item,
replace the embedded adjustable item with a current item, wherein the current item comprises the student's current geographic location, a current season, a current or recent weather, a current or recent news or sports event, or a current or recently studied academic topic, and include the current item in the individualized practice worksheet file in association with the problem that included the embedded adjustable item.

9. The system of claim 1, wherein:

at least some of the problems in the database include an embedded adjustable item; and the instructions in the first set for selecting the plurality of problems or the additional plurality of problems comprise instructions to:

select a problem that includes an embedded adjustable item, access favorite item data for the student, replace the embedded adjustable item with a selected favorite item from the accessed favorite item data, and include the selected favorite item in the individualized practice worksheet file in association with the problem that included the embedded adjustable item.

10. A method of generating an individualized practice worksheet for a student, comprising, by one or more processors:

accessing evaluation data associated with at least one practice worksheet that was previously administered to a student;

accessing a database of worksheet problems;

selecting a plurality of problems from the database based on the evaluation data;

generating an individualized practice worksheet file for the student, wherein the file includes instructions for printing an individualized worksheet comprising the selected problems, a student response area for each selected problem, and a teacher evaluation area for at least one of the selected problems; and after a printed copy of the individualized practice worksheet is completed by the student and evaluated by a teacher:

receiving an electronic file corresponding to the completed worksheet, for each problem in the completed worksheet, determining whether the teacher entered any evaluation marks in the teacher evaluation area for the problem, updating the evaluation data based on the entered evaluation marks, and generating a new individualized practice worksheet file for the student by:

selecting an additional plurality of problems from the database based on the updated evaluation data, and generating the new individualized practice worksheet file, wherein the new individualized practice worksheet file includes instructions for printing a new individualized worksheet comprising the additional selected problems wherein:

generating the individualized practice worksheet file for the student to include instructions for printing the teacher evaluation area in the worksheet comprises generating instructions to print a location for the teacher to evaluate the relevant problem for correctness, and a sub-area for the teacher to provide additional information regarding an academic area in which the student requires additional practice, determining whether the teacher entered any evaluation marks in the teacher evaluation area comprises determining whether the sub-area includes the additional information, updating the evaluation data based on the entered evaluation marks comprises updating the evaluation data based on the correctness and the additional information, and selecting the additional plurality of problems from the database based on the updated evaluation data comprises selecting at least one problem designed to exercise the academic skill for which the additional information indicates that the student requires additional practice.

11. The method of claim 10, wherein:

the academic area in which the student requires additional practice comprises proper use of capital letters, spelling, or punctuation;

updating the evaluation data based on the entered evaluation marks comprises updating the evaluation data to indicate that the student needs to keep practicing proper use of capital letters, spelling, or punctuation.

12. The method of claim 10, wherein:

generating the instructions for the individualized practice worksheet file further comprise instructions for printing at least one additional teacher evaluation area for the teacher to provide additional information about how the student performed overall on the worksheet, wherein the additional information comprises whether the student needs more practice with an academic skill or area, needs more or less time to complete the worksheet, needs to be progressed more quickly through academic skills, or shows signs of reaching a frustration level;

the method further comprises determining whether the additional area includes the additional information from the additional teacher evaluation area; and updating the evaluation data further comprises updating the evaluation data based on the additional information from the additional teacher evaluation area.

13. The method of claim 10, wherein:

determining whether the teacher entered an evaluation mark in the teacher evaluation area for the problem comprises:

recognizing an evaluation mark and ignoring unintentional marks, processing the recognized evaluation mark to determine a meaning of the recognized evaluation mark, and generating an evaluation result comprising what the teacher communicated via the recognized evaluation mark; and updating the evaluation data comprises including the evaluation result in the evaluation data.

14. The method of claim 10, wherein:

each problem in the database is associated with a progression level; and generating a new individualized practice worksheet comprises:

receiving a request to generate a practice worksheet for one or more academic skills, determining a progression level for the student for at least one of the academic skills, and when selecting the additional plurality of problems, selecting the additional plurality of problems as those that are associated with the progression level of the student.

15. The method of claim 14, further comprising determining whether to advance or retreat the student's progression level based on the evaluation data.

16. Method of claim 15, wherein determining whether to advance or retreat the student's progression level further comprises:

receiving risk tolerance data for the student, wherein the risk tolerance data describes the student's tolerance for being challenged with new or difficult academic skills; and also base the determining whether the student should advance or retreat on the risk tolerance data.

17. The method according to claim 10, wherein:

at least some of the problems in the database include an embedded adjustable item; and selecting the plurality of problems or the additional plurality of problems comprises:

selecting a problem that includes an embedded adjustable item, replacing the embedded adjustable item with a current item, wherein the current item comprises the student's current geographic location, a current season, a current or recent weather, a current or recent news or sports event, or a current or recently studied academic topic, and including the current item in the individualized practice worksheet file in association with the problem that included the embedded adjustable item.

18. The method of claim 10, wherein:

at least some of the problems in the database include an embedded adjustable item; and selecting the plurality of problems or the additional plurality of problems comprises:

selecting a problem that includes an embedded adjustable item, accessing favorite item data for the student, replacing the embedded adjustable item with a selected favorite item from the accessed favorite item data, and including the selected favorite item in the individualized practice worksheet file in association with the problem that included the embedded adjustable item.

* * * * *